US011657150B2

(12) United States Patent
Sui et al.

(10) Patent No.: US 11,657,150 B2
(45) Date of Patent: May 23, 2023

(54) TWO-DIMENSIONALITY DETECTION METHOD FOR INDUSTRIAL CONTROL SYSTEM ATTACKS

(71) Applicant: DALIAN UNIVERSITY OF TECHNOLOGY, Liaoning (CN)

(72) Inventors: Tianju Sui, Liaoning (CN); Qingfeng Liu, Liaoning (CN); Ximing Sun, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/887,027

(22) Filed: Aug. 12, 2022

(65) Prior Publication Data

US 2023/0076346 A1    Mar. 9, 2023

(30) Foreign Application Priority Data

Sep. 9, 2021    (CN) .......................... 202111054018.6

(51) Int. Cl.
   G06F 21/55    (2013.01)
(52) U.S. Cl.
   CPC ...... G06F 21/554 (2013.01); *G06F 2221/031* (2013.01)
(58) Field of Classification Search
   CPC ................... G06F 21/554; G06F 2221/031
   See application file for complete search history.

(56) References Cited

U.S. PATENT DOCUMENTS

| 10,505,955 | B2 * | 12/2019 | Mestha | .................. G06F 21/577 |
| 10,911,482 | B2 * | 2/2021 | Mathur | .............. G05B 19/0428 |
| 11,093,606 | B2 * | 8/2021 | Arov | ........................ G06F 21/55 |

(Continued)

FOREIGN PATENT DOCUMENTS

CN    113778054 A    12/2021

OTHER PUBLICATIONS

Paridari et al.—A Framework for Attack-Resilient Industrial Control Systems: Attack Detection and Controller Reconfiguration, 0018-9219 © 2017 IEEE, vol. 106, No. 1, Jan. 2018 (Year: 2017).*

*Primary Examiner* — Meng Li
(74) *Attorney, Agent, or Firm* — Muncy, Geissler, Olds & Lowe, P.C.

(57) ABSTRACT

A two-dimensionality detection method for industrial control system attacks: collecting data; transmitting the data to a PLC and an embedded attack detection system; uploading, by the PLC, received data to an SCADA system; transmitting, by the SCADA system, the data to the embedded attack detection system after classifying and counting the data; before starting detection, directly reading, by the embedded attack detection system, the data measured by sensors; refining data association relationships and probability distribution characteristics of the sensors of normal operation to complete storage of health data model; after starting detection, in first dimensionality, comparing the data collected directly by the sensors with statistical data of the SCADA system to judge the attacked condition of the SCADA system, and in second dimensionality, comparing the characteristics of the data collected directly by the sensors and counted online with the health data model to judge the attacked condition of the sensors.

1 Claim, 2 Drawing Sheets

(56) References Cited

U.S. PATENT DOCUMENTS

| | | | |
|---|---|---|---|
| 11,586,188 B2* | 2/2023 | Cella | G06N 5/046 |
| 2016/0301704 A1* | 10/2016 | Hassanzadeh | H04L 63/0209 |
| 2017/0093885 A1* | 3/2017 | Houmb | H04L 63/145 |
| 2018/0330257 A1* | 11/2018 | Dodson | G06F 21/554 |
| 2019/0056722 A1* | 2/2019 | Abbaszadeh | G06F 21/55 |
| 2019/0141058 A1* | 5/2019 | Hassanzadeh | H04L 41/0631 |
| 2019/0222596 A1* | 7/2019 | Abbaszadeh | G06F 21/552 |
| 2019/0243977 A1* | 8/2019 | Pfleger de Aguiar | G05B 19/05 |
| 2020/0089204 A1* | 3/2020 | Tang | H04L 41/0681 |
| 2020/0202008 A1* | 6/2020 | Pfleger de Aguiar | G06F 11/3485 |
| 2020/0286391 A1* | 9/2020 | Beaurepaire | G08G 5/0091 |
| 2021/0157312 A1* | 5/2021 | Cella | G05B 19/4184 |
| 2021/0211455 A1* | 7/2021 | Wang | H04L 63/1441 |
| 2022/0311790 A1* | 9/2022 | Daultani | G06N 3/084 |
| 2022/0412318 A1* | 12/2022 | Zhao | F03D 80/50 |

* cited by examiner

TWO-DIMENSIONALITY DETECTION METHOD FOR INDUSTRIAL CONTROL SYSTEM ATTACKS

TECHNICAL FIELD

The present invention belongs to the field of industrial field inspection, and more particularly relates to a two-dimensionality detection method for industrial control system attacks.

BACKGROUND

An industrial control system (ICS) is a collection of devices, systems, networks and controllers used to operate, control and assist in automating industrial production processes. The industrial control system comprises supervisory control and data acquisition (SCADA), distributed control systems (DCS), programmable logic controllers (PLC), intelligent terminals, human machine interfaces (HMI), etc. The industrial control system is widely used in the field of industrial control, plays a crucial role in the national infrastructure, and is an important resource related to the national economy and people's livelihood.

With the development of computer and network technologies, deep integration of informatization and industrialization and the rapid development of Internet of Things, more and more industrial control system products use common protocols, common hardware and common software. Thus, the development space of industrial control is expanded, new development opportunities are brought, and the problems of information security of the industrial control system and the like are also brought.

From the industrial control system itself, inherent vulnerabilities and attack methods of the industrial control system are increased. From an external environment, vulnerability discovery capability, attack technology capability and attacker capability of the industrial control system are continuously improved, and the industrial control system faces increasingly upgraded security threats. The mainstream defense-in-depth ideology lacks sufficient capability to monitor and respond to continuously changing security threats. In recent years, some industrial control system attack events such as Stuxnet, Steel plants in Germany and Ukraine's power grid have been broken out, and it is urgent to develop new methods of security protection with the industrial control system as the technical background.

SUMMARY

In view of the problems in the prior art, the purpose of the present invention is to provide a two-dimensionality detection method for industrial control system attacks, which can detect system attacks through data analysis and control methods and has low cost and high reliability.

The present invention has the following technical solution: A two-dimensionality detection method for industrial control system attacks specifically comprises the following steps:

S1, collecting data from underlying sensors of an industrial control system in real time by an industrial control sensor network; transmitting the data to an industrial control system PLC and an independent embedded attack detection system, wherein an embedded processor in the embedded attack detection system does not allow a host computer to update the embedded processor and a download port is not allowed to be connected online; uploading, by the industrial control system PLC, the received sensor data to an SCADA system, and meanwhile, receiving, by the embedded attack detection system, downlink data after the statistics of the SCADA system through network cables;

S2, under the condition of no attack, refining, by the embedded attack detection system, the independent data distribution characteristics of normal operation of each sensor in the industrial control system by reading the data collected by the sensors; the independent data distribution characteristics comprising types of probability distribution near a mean value point, estimated error covariance, and function relationships between variables abstracted based on internal physical relationships of the industrial control system; and storing a refined feature pattern in the embedded processor of stand-alone operation, recorded as a system health data model; and S3, an attack detection method of the industrial control system comprises two-dimensionality;

first dimensionality: comparing the data collected directly by the sensors with statistical data of the SCADA system to detect the attacked condition of the SCADA system, recorded as a first level attack alert; a detection mode is: comparing system control variable data downstream from the SCADA system at the same timestamp with the sensor data directly read by the embedded attack detection system; if a difference exceeds a maximum quantization error range for data transmission, considering that the SCADA system has malicious intrusion;

second dimensionality: comparing a statistical pattern of the data collected directly by the sensors with the health data model to judge the attacked condition of the sensors, recorded as a second level attack alert; wherein the statistical pattern of the data collected directly by the sensors comprises the types of probability distribution, covariance sizes and the function relationships between the variables; a detection mode is: on the premise of not triggering the first level attack alert, firstly counting whether the function relationships between the mean values of variables of the sensors is within an allowable error range of health model function relationships; if beyond the range, considering that sensor drivers have malicious tampering; next, counting types of probability density distribution of the data of each sensor, and covariances, and comparing with the health data model; if a difference is beyond a confidence interval, considering that the sensor drivers have malicious tampering.

The present invention has the following beneficial effects: the industrial control system is low in cost; attacks can be detected only by adding an embedded detection system in the industrial control system; the stability is high; and the data generated in a production process are backed up to effectively ensure the traceability of information. The present invention combines the knowledge of a stochastic process theory, a system data model and a control system, can detect attack threats in the system comprehensively and timely from multiple channels, and effectively improves the security of the industrial control system.

DETAILED DESCRIPTION

Figure 1:
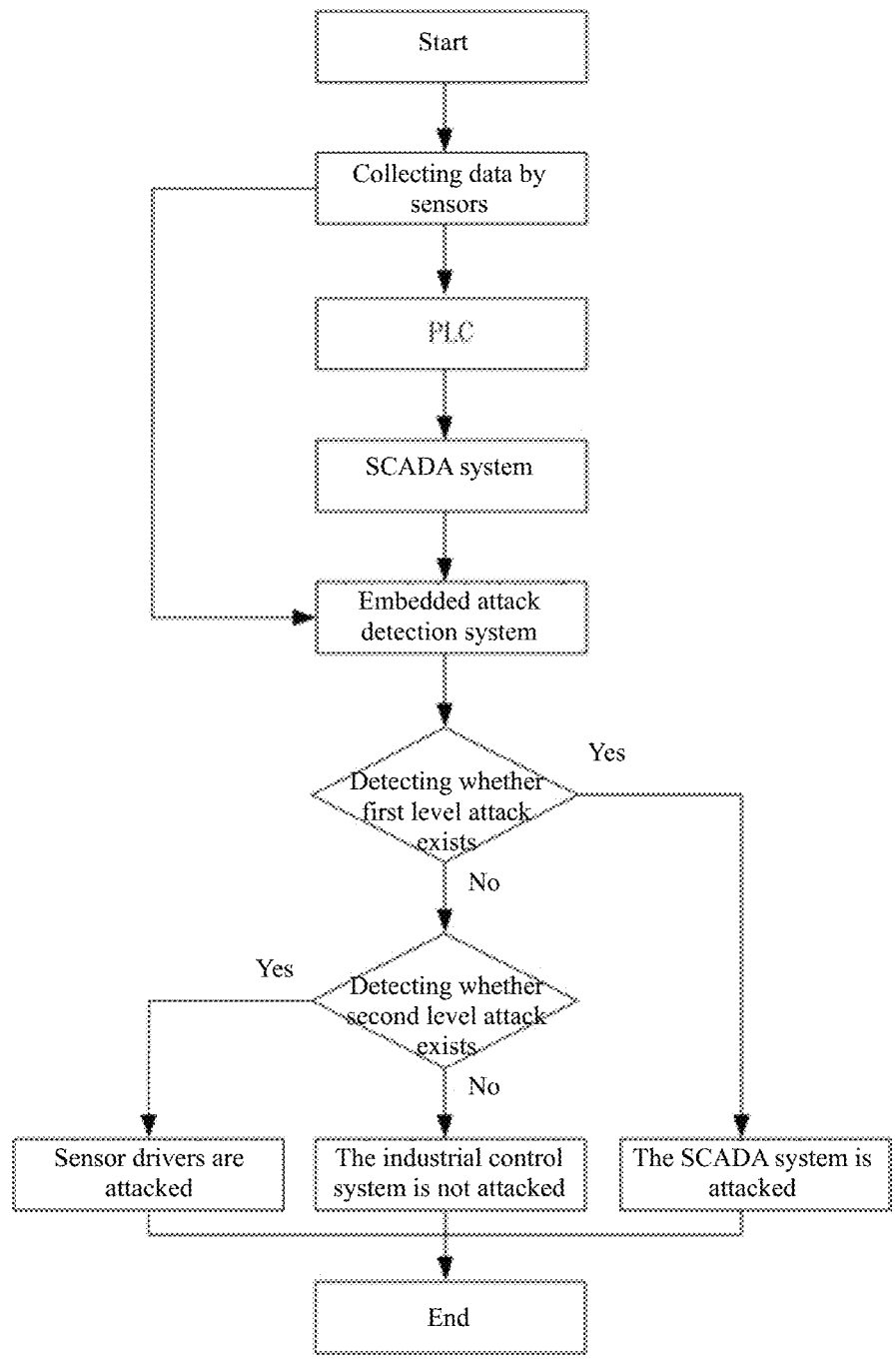
FIG. 1 is a schematic diagram of process structure operation in the present invention.
Figure 2:
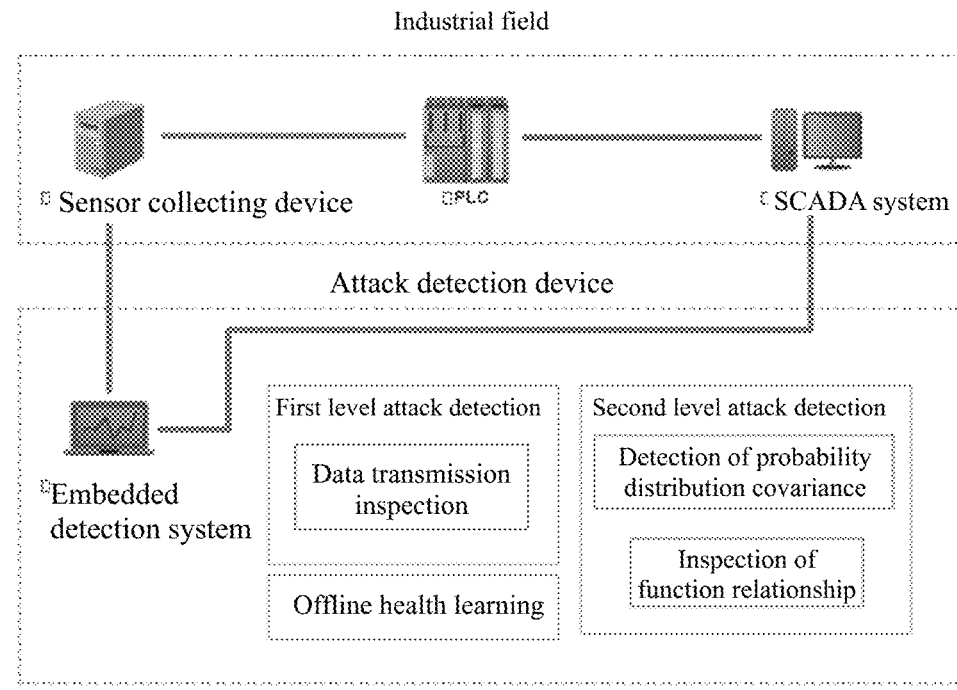
FIG. 2 is a schematic diagram of equipment wiring in the present invention.
Figure 3:
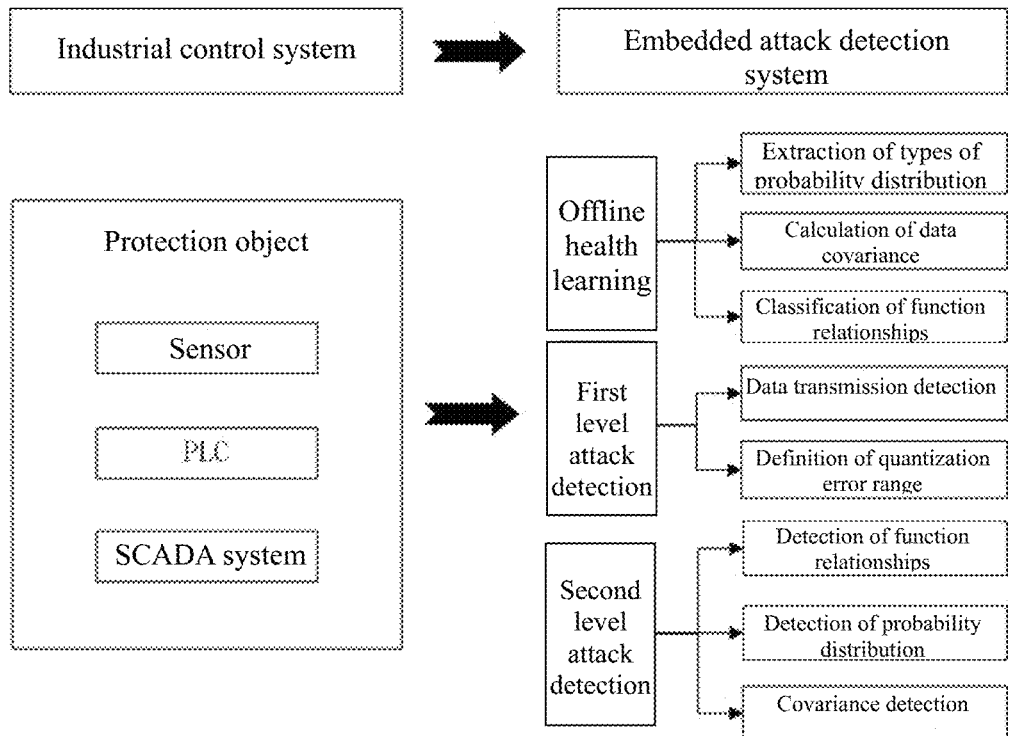
FIG. 3 is a schematic diagram of general system design in the present invention.

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, other embodiments obtained by those ordinary skilled in the art without contributing creative labor will belong to the protection scope of the present invention.

It should be noted in the description of the present invention that terms such as "vertical", "upper", "lower", "horizontal", etc. indicate direction or position relationships shown based on the drawings, and are only intended to facilitate the description of the present invention and the simplification of the description rather than to indicate or imply that the indicated device or element must have a specific direction or constructed and operated in a specific direction, and therefore, shall not be understood as a limitation to the present invention. In addition, the terms such as "first" and "second" are only used for the purpose of description, rather than being understood to indicate or imply relative importance.

It should be noted in the explanation of the present invention that, unless otherwise specifically regulated and defined, terms such as "arranged", "installation," "connected," and "connecting" shall be understood in broad sense, and for example, may refer to fixed connection or detachable connection or integral connection, may refer to mechanical connection or electrical connection, and may refer to direct connection or indirect connection through an intermediate medium or inner communication of two elements. For those ordinary skilled in the art, the specific meanings of the above terms in the present invention may be understood according to concrete conditions.

In examples of the present invention, equipment adopts Siemens S7-200PLC, an SCADA system adopts PLC controls designed by ForceControl software, and an embedded detection system adopts Arm Dual Core Cortex-A9 processor; and sensors comprise temperature sensors, pressure sensors, liquid level sensors and the like. PLC is connected with the SCADA system through network cables; a communication protocol is Modbus; and the embedded detection system is connected with the SCADA system through the network cables for receiving data transmitted by the SCADA system.

In probability theory and statistical theory, covariances are used to measure the overall error of two variables. The error measurement method can just be applied to attack detection. Before the detection of normal operation of the system, the process of establishing a system health data model is:

If an embedded system does not open a programming port, the embedded system cannot be attacked by network attacks. According to the stability of the embedded system, it can ensure that the data of normal operation before the system is put into operation will not be tampered, thereby ensuring the accuracy of reference data. A network transmission port between the system and the outside is closed, and then the system is powered on and operated normally for several cycles. In the operation process, the data collected by the sensors is read out and transmitted to an embedded detection system. The independent data distribution characteristics of the sensors of normal operation are extracted, and the probability density distribution and covariance of the data are calculated according to the distribution characteristics of the data. The internal physical relationships of variables of the industrial control system are summarized into function relationships and stored in the embedded system, recorded as a system health data model and used as a reference model for attack detection.

Attack detection of the industrial control system under a normal operation environment comprises:

First level attack detection: the network transmission port between the system and the outside is started. After the system is powered on, the system is operated normally. In the operation process, the data collected by the sensors is uploaded through PLC equipment, and transmitted to the SCADA system. The embedded detection system receives downlink data of SCADA. The data transmission protocol of PLC and the SCADA system is Modbus, wherein the SCADA system is vulnerable to attacks, and after the SCADA system is attacked, the data received by the SCADA system is also changed; the variable data of the SCADA system at the same timestamp is recorded and compared with the sensor data directly read by an embedded attack detection device; and the data between the two is compared. The purpose of the detection is mainly to detect the attacked condition of the SCADA system. A difference between the two is compared with a set maximum quantization error range. When the difference is greater than a setting value, it is considered that the SCADA system is attacked.

Second level attack detection: on the premise of not triggering the first level attack alert, the physical characteristics of the industrial control system are analyzed by the data measured by the sensors to calculate the function relationships of the system; the function relationships at this moment are compared with the function relationships recorded in the system health data model; whether the function relationships between the mean values of variables of the sensors is within an allowable error range of health function relationships is counted; if beyond the range, it is considered that sensor drivers have malicious tampering; if the function relationships have no problem, types of probability density distribution of the data of each sensor is counted; the current type of probability density distribution is compared with the types of the probability density distribution stored in the health data model; covariances of the data of each sensor are counted, and compared with the covariances stored in the health data model; a hypothesis test is conducted; if a difference is beyond a confidence interval, it is considered that the sensor drivers have malicious tampering and that the system is attacked.

With ideal embodiments according to the present invention as enlightenment, through the above illustration contents, various changes and modifications can be made by those skilled in the art without deviating from the technical idea of the present invention. The technical scope of the present invention is not limited to the contents in the description, but must be determined according to the scope of the claims.

The invention claimed is:

1. A two-dimensionality detection method for industrial control system attacks, specifically comprising the following steps:

S1, collecting data from underlying sensors of an industrial control system in real time by an industrial control sensor network; transmitting the data to an industrial control system including a programmable logic controller (PLC) and an independent embedded attack detection system, wherein an embedded processor in the embedded attack detection system does not allow a host computer to update the embedded processor and a download port is not allowed to be connected online; uploading, PLC, the received sensor data to a supervisory control and data acquisition (SCADA) system, and meanwhile, receiving, by the embedded attack detection system, downlink data after statistics of the SCADA system through network cables;

S2, under the condition of no attack, refining, by the embedded attack detection system, independent data distribution characteristics of normal operation of each sensor in the industrial control system by reading the data collected by the sensors; the independent data distribution characteristics comprising types of probability distribution near a mean value point, estimated error covariance, and function relationships between variables abstracted based on internal physical relationships of the industrial control system; and storing a refined feature pattern in the embedded processor of stand-alone operation, recorded as a system health data model; and S3, an attack detection method of the industrial control system comprises two-dimensionality;

first dimensionality: comparing the data collected directly by the sensors with statistical data of the SCADA system to detect an attacked condition of the SCADA system, recorded as a first level attack alert; a detection mode is: comparing system control variable data downstream from the SCADA system at the same timestamp with the sensor data directly read by the embedded attack detection system; if a difference exceeds a maximum quantization error range for data transmission, considering that the SCADA system has malicious intrusion;

second dimensionality: comparing a statistical pattern of the data collected directly by the sensors with the health data model to judge the attacked condition of the sensors, recorded as a second level attack alert; wherein the statistical pattern of the data collected directly by the sensors comprises the types of probability distribution, covariance sizes and the function relationships between the variables; a detection mode is: on the premise of not triggering the first level attack alert, firstly counting whether the function relationships between the mean values of variables of the sensors is within an allowable error range of health model function relationships; if beyond the range, considering that sensor drivers have malicious tampering; next, counting types of probability density distribution of the data of each sensor, and covariances, and comparing with the health data model; if a difference is beyond a confidence interval, considering that the sensor drivers have malicious tampering.

\* \* \* \* \*